US006576326B2

(12) United States Patent
Hatano et al.

(10) Patent No.: US 6,576,326 B2
(45) Date of Patent: Jun. 10, 2003

(54) INK JET RECORDING SHEET

(75) Inventors: Osamu Hatano, Hino (JP); Eisaku Katoh, Hino (JP); Masayuki Ushiku, Hino (JP); Yoshinori Tsubaki, Hino (JP); Hiroto Itoh, Hino (JP)

(73) Assignee: Konica Corporation (JP)

( * ) Notice: Subject to any disclaimer, the term of this patent is extended or adjusted under 35 U.S.C. 154(b) by 9 days.

(21) Appl. No.: 09/994,352

(22) Filed: Nov. 26, 2001

(65) Prior Publication Data

US 2002/0094420 A1 Jul. 18, 2002

(30) Foreign Application Priority Data

Nov. 27, 2000 (JP) ....................................... 2000-359051

(51) Int. Cl.[7] ............................ B32B 27/14; B32B 3/00
(52) U.S. Cl. ....................................................... 428/195
(58) Field of Search ................................. 428/195, 323, 428/328, 500

(56) References Cited

U.S. PATENT DOCUMENTS

| | | | | | |
|---|---|---|---|---|---|
| 6,093,529 | A | * | 7/2000 | Tsuzuki et al. | 430/619 |
| 6,110,601 | A | * | 8/2000 | Shaw-Klein et al. | 428/522 |
| 6,492,005 | B1 | * | 12/2002 | Ohbayashi et al. | 428/195 |
| 6,505,929 | B1 | * | 1/2003 | Chow | 347/105 |

* cited by examiner

*Primary Examiner*—Cynthia H. Kelly
*Assistant Examiner*—B. Shewareged
(74) *Attorney, Agent, or Firm*—Muserlian, Lucas and Mercanti

(57) ABSTRACT

An ink jet recording sheet comprising a support having thereon a porous ink absorptive layer comprising, inorganic particles, polyvinyl alcohol and a zirconium compound or an aluminum compound, wherein the ink absorptive layer exhibits a concentration gradient of said zirconium compound or the aluminum compound, wherein the concentration increases from the surface of the support towards the surface of the ink absorptive layer.

9 Claims, No Drawings

INK JET RECORDING SHEET

FIELD OF THE INVENTION

The present invention relates to an ink jet recording sheet, and particularly to an ink jet recording sheet which exhibits a small amount of ink bleeding, and results in high color density.

BACKGROUND OF THE INVENTION

In recent years, ink jet recording has increasingly resulted in enhancement of image quality which is approaching that of conventional photography. In order to achieve such conventional photographic quality (also called a photo-grade quality), improvement has been made in the area of recording sheets. A void type recording sheet, which comprises a highly smoothened support having thereon a minute-void layer comprised of fine particles and hydrophilic polymers, exhibits high gloss, results in bright color formation, and exhibits excellent ink absorbability as well as ink drying properties. Accordingly, said recording sheet has been regarded as one of those which are most similar to conventional photographic quality.

In accordance with such requirements for high quality image, the demanded properties for ink jet recording sheets are increasing. Specifically, when a non-water absorptive support is employed, it is possible to maintain the highly smoothened surface, and a result high quality prints can be obtained.

Ink jet ink usually comprises water-soluble dyes.

However, ink, comprised of water-soluble dyes, results in disadvantages such as bleeding and poor water resistance due to the high hydrophilicity of said water-soluble dyes. Namely, when after printing, prints are stored at high humidity for a long period of time, or water droplets are allowed to adhere onto the print surface, said dyes tends to result in bleeding.

Ink jet recording sheets having a porous ink absorptive layer can yield a uniform image due to high ink absorptivity.

On the other hand, there occurs problem that the color density of images decreases due to the light scattering on the surface of fine particles which forms a porous layer.

In order to overcome such drawbacks, it is a general practice to incorporate dye fixing materials such as cationic materials into a porous layer.

A method preferably employed is one in which, for example, an anionic dye is allowed to bond to a cationic polymer so as to be immobilized. Cited as such cationic polymers are polymers of quaternary ammonium salts.

Japanese Patent Publication Open to Public Inspection No. 56-99693 discloses a method in which a cationic surface active agent is bonded to a water-soluble dye to insolubilize.

Further, Japanese Patent Publication Open to Public Inspection Nos. 55-53591, 55-150396, 56-867789, 58-89391, and 58-94491 describe ink jet recording sheets comprised of water-soluble polyvalent metal salts which bond to water-soluble dyes to form minimally water-soluble salts.

Japanese Patent Publication Open to Public Inspection No. 60-257286 describes an ink jet recording sheet comprised of basic polyhydroxyl aluminum compounds.

Further, Japanese Patent Publication Open to Public Inspection Nos. 60-67190, 61-10484, and 61-57379 describe ink jet recording sheets comprised of cationic polymers as well as water-soluble polyvalent metal salts.

However, above-mentioned methods are insufficient to improve water resistance and bleeding during storage. There are no description how to prevent the decrease the density of images printed on a porous ink absorptive layer of ink jet recording sheet.

Further, Japanese Patent Publication Open to Public Inspection No. 4-7189 discloses a method employing a porous pigment and an acid zirconium chloride compound. Said patent specification describes that by adding said acid zirconium chloride salt, desired adhesion strength is obtained employing a relatively small amount of binder, and it is possible to achieve improvement of image quality. But, here again, there is no description about the bleeding during storage or image density decrease.

Japanese Patent Publication Open to Public Inspection No. 6-32046 discloses a method in which a zirconium compound is combined with silica and modified polyvinyl alcohol. There remains problems of productivity and cost because this method uses specific polyvinyl alcohol. And there is no disclosure of ink bleeding during storage in this publication.

Further, Japanese Patent Publication Open to Public Inspection No. 10-258567 discloses a method employing a hydrophilic polymer and a water-soluble compound comprising a 4A group element, in combination, while Japanese Patent Publication Open to Public Inspection No. 10-309862 discloses a method employing a hydrophilic polymer together with a polyhydric carboxylic acid, and a zirconyl compound, also in combination. These references do not describe a porous ink absorptive layer. The ink absorptive layer made of non-porous hydrophilic polymer does not absorb sufficient amount of ink, and improvement of ink bleeding during storage is not enough. They does not describe about the effect on density of the printed image.

Further, European Patent No. 754,560 discloses that a water-soluble binder, a pigment, a zirconium compound, and a cationic polymer are employed in combination.

However, the above-mentioned prior arts do not disclose ways to minimize bleeding after keeping for a long time, or to yield high color density of the printed image.

SUMMARY OF THE INVENTION

An object of the present invention is to provide an ink jet recording sheet in which, after printing, the printed image results in high density and minimized bleeding during storage and improvement in water resistance.

Said objects as above were achieved employing the constitution described below.

1. An ink jet recording sheet comprising a support having thereon a porous ink absorptive layer comprising, inorganic particles, polyvinyl alcohol and a zirconium compound or an aluminum compound, wherein said ink absorptive layer exhibits a concentration gradient of said zirconium compound or said aluminum compound, wherein said concentration increases from the surface of said support towards the surface of said ink absorptive layer.

2. The ink jet recording sheet of item 1, wherein said zirconium compound or said aluminum compound satisfies the following requirement:

$$0 \leqq C_{0.2}/C_{0.8} \leqq 0.8,$$

wherein $C_{0.8}$ and $C_{0.2}$ are a concentration of said zirconium compound or said aluminum compound at a distance of 8/10 and 2/10 of a thickness of the ink absorptive layer from the surface of the support, respectively.

3. The ink jet recording sheet of item 1, wherein the ink absorptive layer comprises at least two layers, wherein an amount of said zirconium compound or said aluminum compound expressed in $g/m^2$ in each of the two layers satisfies the following requirement:

$$0<C_I/C_{II}\leqq 0.8,$$

wherein $C_I$ is the amount of said zirconium compound or said aluminum compound in a lower layer and $C_{II}$ is the amount of said zirconium compound or said aluminum compound in an upper layer.

4. The ink jet recording sheet of claim 1, wherein an average diameter of primary particles of said inorganic particles is from 20 to 100 nm.

5. The ink jet recording sheet of claim 1, wherein a weight ratio of said inorganic particles to said polyvinyl alcohol is from 2:1 to 20:1.

6. The ink jet recording sheet of claim 1, wherein said support is a non-water absorptive support.

7. The ink jet recording sheet of claim 1, wherein said ink absorptive layer further comprises a cationic polymer.

8. The ink jet recording sheet of claim 1, wherein said polyvinyl alcohol is hardened with a hardener.

9. A method of preparing the ink jet recording sheet of item 1, comprising the steps of:

a) applying a coating composition comprising the inorganic particles and polyvinyl alcohol to the support so as to form a first coating layer; and b) applying another coating composition comprising the zirconium compound or the aluminum compound on the first coating layer so as to form the ink absorptive layer.

DETAILED DESCRIPTION OF THE INVENTION

The present invention will now be detailed.

The ink absorptive layer is divided into two main groups, that is, one is a so-called swelling-type ink absorptive layer composed mainly of a hydrophilic binder, and the other is a void-type ink absorptive layer being made of inorganic fine particles and a small amount of hydrophilic binder.

The ink absorptive layer of the present invention is a void-type. The void-type is preferable because of its high ink absorptivity. Moreover the void-type is by nature superior to the swelling-type regarding ink bleeding during storage. The fine particles in the void-type layer prevent the dyes from diffusing. On the other hand, there is no such obstacle in the swelling-type layer, and the dyes tend to diffuse in the hydrophilic binder more easily. In contrast to the above-mentioned feature of the void-type layer, the void-type layer has a drawback of decreasing the color density. This is derived from the light scatter on the surface of the fine particles which form the void-type layer.

And as a result, transparency of the void-type layer is less than that of the swelling-type layer.

As is mentioned above, the void-type layer has by nature larger ink absorptivity and smaller bleeding during storage than the swelling-typo layer.

An object of the present invention is to further improve the bleeding of the void-type layer during storage. Another object of the present invention is to increase the color density of the image, which is difficult to achieve compared with the swelling-type layer.

It was found that the above-mentioned objects can be achieved by using zirconium compounds or aluminum compounds. Some kind of interaction between polyvinyl alcohol and the zirconium compounds or the aluminum compounds is supposed to prevent the diffusion of the dyes in the layer.

It was further found that the bleeding can be decreased when the density of the zirconium compounds or the aluminum compounds in the ink absorptive layer increases according to the increase of the distance from the support. Moreover, the increase of the color density of the image can be achieved at the same time. More specifically, it was found that there exists an optimum density distribution of the zirconium compounds or the aluminum compounds in the ink absorptive layer to achieve the objects of the present invention.

Above-mentioned effects of the present invention may be explained as follows: When a larger amount of the zirconium compounds or the aluminum compounds is loaded in the far portion in the ink absorptive layer from the support, that is in the near portion of the surface of the ink absorptive layer, the dyes entered from the surface of the ink absorptive layer ca be effectively trapped by the zirconium compounds or the aluminum compounds. And as a consequence, bleeding can be effectively prevented. The dyes tend to remain in the near place of the surface of the ink absorptive layer. Therefore, the effect of light scattering on the surface of the fine particles is decreased and the decrease of the color density of the image can be prevented.

It was found that items 3 and 4 can facilitate to make the recording sheet of the present invention. The loading of a larger amount of the zirconium compounds or the aluminum compounds in the far portion of the ink absorptive layer can be easily carried out by a two or a multi-layer coating.

That is, a coating solution which contains a smaller amount of the zirconium compounds or the aluminum compounds is coated in the near portion of the support, and then a coating solution which contains a larger amount of the zirconium compounds or the aluminum compounds is coated in the far portion from the support.

Another method to obtain the above-mentioned density gradation can be achieved by over-coating a coating solution of the zirconium compounds or the aluminum compounds on the ink absorptive layer previously formed on the support and penetrating the zirconium compounds or the aluminum compounds into the ink absorptive layer.

The zirconium compounds and the aluminum compounds of the present invention are detailed below.

The compounds containing a zirconium atom or an aluminum atom may be either water-soluble or non-water soluble, as long as those can be uniformly incorporated into said ink absorptive layer. However, in order to achieve the effects of the present invention, water-soluble compounds are preferred.

Said compounds containing a zirconium atom or an aluminum atom, which are usable in the present invention, may be any of the single or double salts of inorganic or organic acids, organic metal compounds, or metal complexes.

Listed as specific examples of zirconium atom containing compounds which are usable in the present invention are zirconium difluoride, zirconium trifluoride, zirconium tetrafluoride, hexafluorozirconate (for example, potassium salts), heptafluorozirconate (for example, sodium salts, potassium salts, and ammonium salts), octafluorozirconate (for example, lithium salts), zirconium fluoride oxide, zirconium dichloride, zirconium trichloride, zirconium tetrachloride, hexachlorozirconate (for example, sodium salts and potassium salts), zirconium oxychloride (zirconyl chloride), zirconium dibromide, zirconium tribromide, zirconium tetrabromide, zirconium bromide oxide, zirconium triiodide, zirconium tetraiodide, zirconium peroxide, zirconium hydroxide, zirconium sulfide, zirconium sulfate, zirconium p-toluenesulfonate, zirconyl sulfate, sodium zirconyl sulfate, acidic zirconyl sulfate trihydrate, potassium zirconyl sulfate, zirconium selenate, zirconium nitrate, zirconyl nitrate, zirconium phosphate, zirconium carbonate, ammonium zirconyl carbonate, zirconium acetate, zirconyl acetate, ammonium zirconyl acetate, zirconyl lactate, zirconyl citrate, zirconyl stearate, zirconium phosphate, zirconyl phosphate, zirconium oxalate, zirconium isopropionate, zirconium butyrate, zirconium acetylacetonate, acetyl acetone zirconium butyrate, zirconium stearate butyrate, zirconium acetate, and bis(acetylacetonato)dichlorozirconium, and tris (acetylacetonato)chlorozirconium.

Of these compounds containing a zirconium atom, preferred are compounds which can be stably incorporated to the coating solution for ink absorptive layer. More specifically, preferred are; zirconyl carbonate, ammonium zirconyl carbonate, zirconyl acetate, zirconyl nitrate, zirconium oxychloride, zirconium lactate, and zirconyl citrate. Most preferred are ammonium zirconyl carbonate and zirconyl acetate.

Listed as specific examples of aluminum atom containing compounds which are usable in the present invention are aluminum fluoride, hexafluoroaluminate (for example, potassium salts), aluminum chloride, basic aluminum chloride (polyaluminum chloride), tetrachloroaluminate (for example, sodium salts), aluminum bromide, tetrabromoaluminate (for example, potassium salts), aluminum iodide, aluminate (for example, sodium salts, potassium salts, and calcium salts), aluminum chlorate, aluminum perchlorate, aluminum thiocyanate, aluminum sulfate, basic aluminum sulfate, aluminum sulfate potassium (alum), ammonium aluminum sulfate (ammonium alum), sodium sulfate aluminum, aluminum phosphate, aluminum nitrate, aluminum hydrogenphosphate, aluminum carbonate, polyaluminum sulfate silicate, aluminum formate, aluminum acetate, aluminum lactate, aluminum oxalate, aluminum isopropirate, aluminum butyrate, ethyl acetate aluminum diisopropirate, aluminum tris(acrtylacetonate), aluminum tris(ethylacetoacetate), and aluminum monoacetylacetonatebis(ethylacetoacetate).

Of these, preferred are aluminum chloride, basic aluminum chloride, aluminum sulfate, basic aluminum sulfate, and basic aluminum sulfate silicate.

Said compounds containing a zirconium atom or an aluminum atom may be incorporated into an ink absorptive layer forming coating composition. The resulting coating composition is coated and subsequently dried. Alternatively, after coating and drying a porous layer, said compounds may be incorporated into said ink absorptive layer, employing an overcoating method.

The used amount of said compounds containing a zirconium atom or an aluminum atom is generally in the range of 0.01 to 5 g per $m^2$ of the ink jet recording sheet, is preferably in the range of 0.05 to 2 g, and is most preferably in the range of 0.1 to 1 g.

The concentration distribution of a zirconium compound or an aluminum compound is not uniform in the depth direction of the ink absorptive layer of the ink-jet recording sheet of the present invention. The amount of the zirconium compound or the aluminum compound is larger in the far portion of the ink absorptive layer from the support than in the near portion of the ink absorptive layer. The conceentration distribution of a zirconium compound or an aluminum compound in the depth direction can be measured with EPMA (Electron Probe Micro Analysis) or TOF-SIMS (Time of Flight Secondary Ion Mass Spectrometry) against the cross section sample prepared by using microtome. This can be achieved by measuring the amount of zirconium atom or aluminum atom in the depth direction can be measured.

Fine inorganic particles employed in the ink jet recording sheet of the present invention will now be descrobed.

Employed as said fine inorganic particles may be various types of fine solid particles conventionally known in the art of ink jet recording sheets.

Cited as examples of said fine inorganic particles may be white inorganic pigments such as precipitated calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, synthetic non-crystalline silica, colloidal silica, alumina, colloidal alumina, pseudo boehmite, aluminum hydroxide, lithopone, zeolite, and magnesium hydroxide.

The average diameter of the primary particles of said fine inorganic particles is preferably from 20 to 100 nm in order to yield a high glossiness.

Said fine particles may be employed in a state of primary particles or in a state of secondary coagulated particles dispersed into the binders. The particle diameter of the inorganic fine particles is defined as a diameter of a maximum degree of coagulated particles found in a dried coated sheet. A diameter of a maximum degree of coagulated particles means as follows: when primary particles coagulated to form secondary particles, the particle diameter of the secondary particles is considered to be the particle diameter of the present invention.

Composite particles comprised of fine inorganic particles and a small amount of organic materials (which may be either lower molecular weight compounds or polymers) are basically designated as the fine inorganic particles according to the present invention. Even in this case, the diameter of the highest order particles observed in the dried layer is determined as that of the fine inorganic particles.

The average diameter of said fine particles may be obtained as follows. Said particles themselves, or the cross-section or surface of a void layer, is observed employing an electron microscope, and each diameter of many randomly selected particles is determined. The simple average (being the number average) is obtained as the diameter of said particles based on the determined diameter. Herein, each particle diameter is represented by the diameter of the circle having the same projection area as that of said particle.

The ratio of organic materials/fine inorganic particles in said composite particles comprised of fine inorganic particles and a small amount of organic materials is generally from 1/100 to 1/4.

Preferred as the fine inorganic particles according to the present invention are those which are less expensive, have a low refractive index from the viewpoint of being capable of producing a high reflection density. Of those, silica, especially silica synthesized employing a gas phase method or colloidal silica, is more preferred.

Further, it is possible to employ cation surface-treated silica synthesized employing a gas phase method, cation surface-treated colloidal silica and alumina, colloidal alumina, and pseudo boehmite.

The added amount of fine inorganic particles, employed in the ink absorptive porous layer, varies largely depending on the desired ink absorption capacity, the void ratio of the void layer, the types of fine inorganic particles, and the types of hydrophilic binders, but is generally from 3 to 30 g per $m^2$ of the recording sheet, and is preferably from 5 to 25 g. The ratio of fine inorganic particles to polyvinyl alcohol, employed in said ink absorptive layer, is generally from 2:1 to 20:1, and is preferably from 3:1 to 10:1.

As the added amount of said fine inorganic particles increases, the ink absorption capacity also increases, while curling and cracking do tend to occur. Accordingly, a method, in which the ink absorption capacity is increased by controlling the void ratio, is more preferred. The void ratio is preferably from 40 to 75 percent. It is possible to adjust said void ratio utilizing the selected fine inorganic materials, the types of binders, or the mixing ratio thereof, or the amount of other additives.

The void ratio, as described herein, is the ratio of the total volume of voids to the volume of the void layer, and can be calculated utilizing the total volume of the layer constituting materials and the thickness of the layer. Further, the total volume of the voids is easily obtained through the saturated transition amount and the absorbed water amount utilizing Bristow's Measurement, which is described in J. TAPPI Paper-Pulp Test Method No. 51-87, which indicates liquid absorptiveness of paper and paper board. The relating reference is found in a literature, Tappi J, 65 (12) 98 (1982).

Polyvinyl alcohol incorporated into the ink jet recording sheet of the present invention will now be described.

Polyvinyl alcohol employed in the present invention include common polyvinyl alcohol prepared by hydrolyzing polyvinyl acetate, and in addition, modified polyvinyl alcohol such as terminal cation-modified polyvinyl alcohol and anion-modified polyvinyl alcohol having an anionic group.

The average degree of polymerization of polyvinyl alcohol prepared by hydrolyzing vinyl acetate is preferably 1,000 or more, and is more preferably from 1,500 to 5,000. Further, the saponification ratio is preferably from 70 to 100 percent, and is more preferably from 80 to 99.5 percent.

Said cation-modified polyvinyl alcohol includes, for example, polyvinyl alcohol having a primary, secondary or tertiary amino group, or a quaternary ammonium group in the main or side chain of said polyvinyl alcohol, as described in Japanese Patent Publication Open to Public Inspection No. 61-10483, and can be prepared by saponifying the copolymer of ethylenic unsaturated monomers having a cationic group, and vinyl acetate.

Listed as ethylenic unsaturated monomers are, for example, trimethyl-(2-acrylamido-2,2-dimethylethyl) ammonium chloride, trimethyl-(3-acrylimido-3,3-dimethylpropyl)ammonium chloride, N-vinylimidazole, N-vinyl-2-methylimidazole, N-(3-dimethylaminopropyl) methacrylamide, hydroxyethyltrimethylammonium chloride, trimethyl-(2-methacryamidopropyl)ammonium chloride, and N-(1,1-dimethyl-3-dimethylaminopropyl) ammonium chloride.

The content ratio of said monomers containing a cation-modified group of said cation-modified polyvinyl alcohol is from 0.1 to 10 mol percent with respect to the vinyl acetate, and is preferably from 0.2 to 5 mol percent.

Listed as anion-modified polyvinyl alcohol are, for example, polyvinyl alcohol containing an anionic group, described in Japanese Patent Publication Open to Public Inspection No. 1-206088, copolymers of vinyl alcohol and vinyl compounds containing a water solubilizing group, described in Japanese Patent Publication Open to Public Inspection Nos. 61-237681 and 63-307979, and modified polyvinyl alcohol containing a water solubilizing group, described in Japanese Patent Publication Open to Public Inspection No. 7-285265.

Further, listed as nonion-modified polyvinyl alcohols are, for example, polyvinyl alcohol derivatives in which a polyalkylene oxide group is added to a part of polyvinyl alcohol, described in Japanese Patent Publication Open to Public Inspection No. 7-9758, and block copolymers of vinyl compounds having a hydrophobic group and polyvinyl alcohol, described in Japanese Patent Publication Open to Public Inspection No. 8-25795.

Further, various types of polyvinyl alcohols, in which the degree of polymerization, the degree of saponification, or modification is different, may be employed in a combination of at least two types.

The supports employed in the recording sheet of the present invention will now be described.

Employed as supports of the ink jet recording sheet of the present invention are not specifically limited. When a water absorptive support such as paper is employed, cockling may be take place with splashed water on the printed recording sheet due to the decrease of the flatness of the support. The dye, the zirconium compound, or the aluminum compound tend to diffuse into the support, and there may occur the problems such as decrease of waterfastness, increase of bleeding, and decrease of the color density of the image. AS a result, non-water absorptive supports are preferable for the effective achievement of the present invention.

Employed as supports in the present invention are the support used for conventionally known in the ink-jet recording sheet.

As said water absorptive support, paper supports, cloth and wood supports are usable. Paper supports are preferably used because of their high water absorptivity and low cost.

A raw material used for a paper support contains chemical pulp such as LBKP and NBKP, mechanical pulp such as GP, CGP, RMP, TMP, CTMP, CMP, and PGW, recycled paper pulp such as DIP. When required, various kinds of fibrous material such as synthetic pulp, synthetic fibers or inorganic fibers can also be used as a raw material.

It is possible to add conventionally known additives to the raw paper. Such additives include sizing agents, pigments, paper-strengthening agents, fixing agents, fluorescent brightening agents, moisture-holding agents, and softening agents.

The paper support can be manufactured with conventional paper making equipment such as a Fourdrinier machine, a cylinder machine, and a twin wire machine after applying several kinds of additives to the above-mentioned fibers, such as wood pulp. The paper support may be size-pressed with starch or polyvinyl alcohol during or after manufacture as required. Several types of coatings or calender treatments may also be conducted.

A support employed in the present invention is preferably a non water-absorptive support. One of the problems to be solved by the present invention is bleeding of ink. This problem is relatively small when the support is water-absorptive such as paper, but becomes evident when the support is non water-absorptive. Listed as non-water absorptive supports are plastic resinous film supports and supports prepared by covering both sides of paper with a resinous film.

Listed as plastic resinous film supports are polyester film, polyvinyl chloride film, polypropylene film, cellulose triacetate film, and polystyrene film, or film supports obtained by laminating any of these.

Of these plastic resinous films, either transparent or translucent supports may be employed.

In the present invention, non-water absorptive supports are preferred, which result in no wrinkling during printing. Particularly preferred supports are those prepared by covering both sides of the paper base with plastic resins, and the most preferred supports are those prepared by covering both sides of the paper base with polyolefin resins.

The supports prepared by covering both sides of said paper with polyolefin resins will now be described, which are preferably employed in the present invention.

Paper employed in the supports of the present invention is made employing wood pulp as the main raw material and in addition, if desired, synthetic pulp such as polypropylene and synthetic fiber such as nylon and polyester. Employed as said wood pulp may be any of LBKP, LBSP, NBKP, NBSP, LDP, NDP, LUKP, and NUKP. However, it is preferable that LBKP, NBSP, LBSP, NDP, and LDP comprising short fiber component in a relatively large amount are preferably employed in a larger amount. Incidentally, the ratio of LBSP and/or LDP is preferably from 10 to 70 percent.

Preferably employed as said pulp is chemical pulp (sulfate pulp and sulfite pulp) comprising minimal impurities. Further, also useful is pulp which has been subjected to a bleaching treatment to increase its whiteness.

Suitably incorporated into said paper may be sizing agents such as higher fatty acids and alkylketene dimer; white pigments such as calcium carbonate, talc, and titanium oxide; paper strength enhancing agents such as starch, polyacrylamide, and polyvinyl alcohol; optical brightening agents; moisture retention agents such as polyethylene glycols; dispersing agents; and softeners such as quaternary ammonium.

The degree of water freeness of pulp employed for paper making is preferably between 200 and 500 ml according to CSF Specification. Further, the sum of the weight percent of 24-mesh residue and the weight percent of 42-mesh calculated portion regarding the fiber length after beating, specified in JIS P 8207, is preferably between 30 and 70 percent. Further, the weight percent of 4-mesh residue is preferably 20 percent by weight or less.

The weight of said paper is preferably from 50 to 250 $g/m^2$, and is most preferably from 70 to 200 $g/m^2$. The thickness of said paper is preferably from 50 to 210 $\mu$m.

During the paper making stage, or alternatively after paper making, said paper may be subjected to a calendering treatment resulting in excellent smoothness. The density of said paper is generally from 0.7 to 1.2 $g/m^2$ (JIS P 8118). Further, the stiffness of said paper is preferably from 20 to 200 g under the conditions specified in JIS P 8143.

Surface sizing agents may be applied onto the paper surface. Employed as said surface sizing agents may be the same as those above, capable of being incorporated into said base paper.

The pH of said paper, when determined employing a hot water extraction method specified in JIS P 8113, is preferably from 5 to 9.

Polyolefin resins, which cover both sides of said paper, will now be described.

Preferably employed as polyolefin resins to achieve said purposes are polyethylene, polypropylene, polyisobutylene, and polyethylene. Of these, polyolefins such as copolymers comprised of propylene as the main component are preferred, and polyethylene is particularly preferred.

The particularly preferred polyethylene will now be described.

Polyethylene, which covers both surfaces of paper, is mainly comprised of low density polyethylene (LDPE) and/or high density polyethylene (HDPE), but it is also possible to partially employ LLDPE and polypropylene.

Specifically, rutile or anatase type titanium dioxide is preferably incorporated into the polyolefin layer on the coating layer side so as to improve opacity as well as whiteness. The content ratio of said titanium oxide is commonly from 1 to 20 percent with respect to the polyolefin, and is preferably from 2 to 15 percent.

High heat resistant color pigments and optical brightening agents for adjusting white background may be incorporated into said polyolefin layer.

Listed as said color pigments are ultramarine, Prussian blue, cobalt blue, phthalocyanine blue, manganese blue, cerulean, tungsten blue, molybdenum blue, and anthraquinone blue.

Listed as said optical brightening agents are dialkylaminocoumarin, bisdimethylaminostilbene, bismethylaminostilbene, 4-alkoxy-1,8-naphthalenenedicaroxylic acid-N-alkyklimide, bisbenzoxazolylethylene, and dialkylstilbene.

The amount of polyethylene used on both surfaces of paper is selected so as to optimize curling at low and high humidity after providing an ink absorptive layer as well as a backing layer. The thickness of the polyethylene layer on the ink absorptive layer side is generally in the range of 15 to 50 $\mu$m, while said thickness on the backing layer side is generally from 10 to 40 $\mu$m. It is preferable that the ratio of polyethylene on the front surface to that on the opposite surface is determined to optimize curling which varies depending on the type and thickness of the ink receptive layer and the thickness of the core paper. Said polyethylene ratio of the front surface/opposite surface is generally from about 3/1 to about 1/3 in terms of the thickness.

Further, it is preferable that said polyethylene coated support exhibits characteristics (1) through (7), described below.

(1) Tensile strength is preferably from 2 to 30 kg in the longitudinal direction and from 1 to 20 kg in the lateral direction, in terms of the strength specified in JIS P 8113.

(2) Tear strength is preferably from 20 to 300 g in the longitudinal direction and from 10 to 250 g in the lateral direction, in terms of the strength specified in JIS P 8116.

(3) Compressive elasticity modulus is preferably at least 9.8 $kN/cm^2$.

(4) Opacity is preferably at least 80 percent and is most preferably from 85 to 98 percent, when determined employing the method specified in JIS P 8138.

(5) Preferable whiteness of $L^*$, $a^*$, and $b^*$, specified in JIS Z 8727, are to be in the following range: $L^*$ from 80 to 96; $a^*$ from −3 to +5; and $b^*$ from −7 to +2.

(6) Clark stiffness of the support is preferably from 50 to 300 $cm^2$/100 in the recording sheet conveying direction.

(7) Moisture of said paper is to be from 4 to 10 percent with respect to the core paper.

The ink jet recording sheet of the present invention preferably contains a cationic polymer in order to effectively prevent ink bleeding.

The cationic polymers employed in the ink jet recording sheet of the present invention will now be described.

The cationic polymers of the present invention are polymers having a primary amino group, a secondary amino group, a tertiary amino group, a quaternary ammonium salt group, or a quaternary phophonium salt group in a main chain or a side chain of a polymer.

Conventionally known polymers in ink jet recording may be used as cationic polymers. Practically water-soluble polymers are preferably used by considering the easiness of manufacturing.

Examples of such cationic polymers are; polyethyleneimines, polyallylamines, polyvinylamines, dicyandiamide-polyalkylenepolyamine condensates, polyalkylenepolyamine-dicyandiamideammonium condensates, dicyandiamide-formalin condensates, addition polymers of epichlorohydrin-dialkylamine, polymers of diallyldimethylammoniumchloride, copolymers of diallyldimethylammoniumchloride-$SO_2$, polyvinylimidazoles, polyvinypyrrolidones, copolymers of vinylimidazole, polyvinylpyridine, polyamidines, chitosan, cationized starch, polymers of vinylbenzyltrimethylqammoniumchloride, (2-methacryloyloxyethyl)trimethylammoniumchloride and polymers of dimethylaminoethylmethacrylate.

Another examples are listed in an article of KAGAKU KOGYO JIHO on Aug. 15, 1998, and on Aug. 25, 1998, and in "KOBUNSHIYAKUZAINYUUMON"(Introduction of Polymer Medicines), Sanyo Kasei Co. Ltd, p 787, (1992).

The average molecular weight of cationic polymers according to the present invention is preferably in the range of 2,000 to 500,000, and is more preferably in the range of 10,000 to 200,000.

The average molecular weight, as described herein, refers to the number average molecular weight, and also refers to ethylene glycol converted values obtained employing gel permeation chromatography.

Further, when the cationic polymers according to the present inventin are previously added to a coating composition, said polymers may be uniformly added to said coating composition or may be added so as to form composite particles together with fine inorganic particles. Listed as methods for forming composite particles employing fine inorganic particles and cationic polymers are a method in which fine inorganic particles are mixed with cationic polymers so that said fine inorganic particles are adsorbed with and covered by said cationic polymers, a method in which the resulting covered particles are coagulated so as to obtain higher degree composite particles, or a method in which coarse particles obtained by mixing are converted into uniform composite particles employing a homogenizer.

The cationic polymers according to the present invention are generally water soluble due to possession of a water-solubilizing group. However, due to compositions of copolymerizing components, some may be insoluble in water. In order to make the production easier, they are preferably water-soluble. However, when they are barely soluble in water, it is possible to dissolve and employ them utilizing water-miscible organic solvents.

Said water-miscible organic solvents, as described herein, refer to organic solvents including alcohols such as methanol, ethanol, isopropanol, and n-propanol; glycols such as ethylene glycol, diethylene glycol, and glycerin; esters such as ethyl acetate and propyl acetate; ketones such as acetone and methyl ethyl ketone; and amides such as N,N-dimethylformamide, which are soluble in water generally in a amount of at least 10 percent. In this case, it is preferable that the used amount of organic solvents is less than that of water.

The amount of cationic polymers used in the recording sheet is commonly in the range of 0.1 to 10 g per 1 $m^2$ of said recording sheet, and is preferably from 0.2 to 5 $g/m^2$.

The ink jet recording sheet of the present invention preferably includes polyvinylalcohol hardened with hardeners in order to have higher glossiness and higher void ratio of the ink absorptive layer without decreasing the strength of the coating layer.

Generally, hardeners are compounds having a group capable of reacting with polyvinyl alcohol or compounds which accelerate the reaction between different groups incorporating polyvinyl alcohol. Listed as such hardeners are epoxy based hardeners (diglycidyl ethyl ether, ethylene glycol diglycidyl ether, 1,4-butanediol diglycidyl ether, 1,6-diglycidylcyclohexane, N,N-glycidyl-4-glycidyloxyaniline, sorbitol polyglycidyl ether, and glycerol polyglycidyl ether), aldehyde based hardeners (formaldehyde and glyoxal), active halogen based hardeners (2,4-dichloro-4-hydroxy-1,3,5-s-trizine), and active vinyl based compounds (1,3,5-trisacryloyl-hexahydro-s-triazine, bisvinylsulfonyl methyl ether), aluminum alum, and isocyanate compounds. Of these, boric acid and salts thereof, epoxy based hardeners, and isocyanate compounds are preferred.

Boric acid and salts thereof, employed in the present invention, refer to oxygen acid having a boron atom as the central atom and/or salts thereof, and specifically include orthoboric acid, diboric acid, metaboric acid, tetraboric acid, pentaboric acid, and octaboric acid, and salts thereof.

The amount of boric acid and salts thereof used varies and depends on the types of polyvinyl alcohol, the types of cross-linking agents, the types of fine inorganic particles, and the ratio with respect to polyvinyl alcohol. However said used amount is commonly from 5 to 500 mg per g of said polyvinyl alcohol, and is preferably from 10 to 300 mg.

Boric acid and/or salts thereof, when an ink absorptive layer forming water-soluble coating composition employed in the present invention is coated, may be incorporated into said coating composition. Alternatively, after said ink absorptive layer forming water-soluble coating composition (including no hardeners) is coated and subsequently dried, boric acid and/or salts thereof may be provided in such a manner that its or their solution is subjected to overcoating.

In addition to said additives, various other additives may be incorporated into the ink absorptive layer as well as other layers provided, as required of the ink recording sheet of the present invention.

The following various types of additives, known in the art, may also be incorporated: for example, polystyrene, polyacrylic acid esters, polymethacrylic acid esters, polyacrylamides, polyethylene, polypropylene, polyvinyl chloride, polyvinylidene chloride, or copolymers thereof; minute organic latex particles of urea resins or melamine resins; various types of cationic or nonionic surface active agents; UV absorbers described in Japanese Patent Publication Open to Public Inspection Nos. 57-74193, 57-87988, and 62-261476; anti-fading additives described in Japanese Patent Publication Open to Public Inspection Nos. 57-74192, 57-87989, 60-72785, 61-146591, 1-95091, and 3-13376; optical brightening agents described in Japanese Patent Publication Open to Public Inspection Nos. 59-42993, 59-52689, 62-280069, 61-242871, and 4-219266; pH regulators such as sulfuric acid, phosphoric acid, citric acid, sodium hydroxide, potassium hydroxide, and potassium carbonate; antifoaming agents, antiseptics, thickeners, antistatic agents, and matting agents.

The ink absorptive layer may comprises more than two layers. In that case, the composition of the multiple layers may be the same or different from each other.

It is possible to apply various types of ink absorptive layers and sublayers of the ink jet recording paper of the present invention, which are provided as required, onto a support, employing a method suitably selected from those known in the art. The preferred methods are such that the coating composition constituting each layer is applied onto a support and subsequently dried. In this case, it is possible to simultaneously apply at least two layers onto said support, and simultaneous coating is particularly preferred in which all hydrophilic binder layers are simultaneously coated.

Employed as coating methods are a roll coating method, a rod bar coating method, an air knife coating method, a spray coating method, and a curtain coating method. In addition, preferably employed is the extrusion coating method employing a hopper, described in U.S. Pat. No. 2,681,294.

When images are recorded employing the ink jet recording sheet of the present invention, a recording method, employing a water-based ink, is preferably utilized.

The water-based ink, as described herein, refers to a recording liquid comprised of colorants and liquid media described below, as well as other additives. Employed as said colorants are direct dyes, acidic dyes, basic dyes, reactive dyes, water-soluble food dyes, or water-dispersible pigments, which are known in the art of ink jet printing.

Listed as solvents in said water-based ink are water and various water-soluble organic solvents, including for example, alcohols such as methyl alcohol, isopropyl alcohol, and butyl alcohol, tert-butyl alcohol, and isobutyl alcohol; amides such as dimethylformamide and dimethylacetamide; ketones or ketone alcohols such as acetone and diacetone alcohol; ethers such as tetrahydrofuran and dioxane; polyalkylene glycols such as polyethylene glycol and polypropylene glycol; polyhydric alcohols such as ethylene glycol, propylene glycol, butylene glycol, triethylene glycol, 1,2,6-hexanetriol, thioglycol, hexylene glycol, diethylene glycol, glycerin, and triethanolamine; and lower alkyl ethers of polyhydric alcohols such as ethylene glycol methyl ether, diethylene glycol methyl (or ethyl) ether, and triethylene glycol monobutyl ether.

Of these, preferred are polyhydric alcohols such as diethylene glycol, triethanolamine, and glycerin, and lower alkyl esters of polyhydric alcohols such as triethylene glycol monobutyl ether.

Listed as other water-based ink additives are, for example, pH regulators, metal sequestering agents, mildewcides, viscosity modifiers, surface tension controlling agents, wetting agents, surface active agents, and antirusting agents.

In order to improve the wettability of said water-based ink to said recording sheet, said water-based ink generally exhibits a surface tension in the range of 0.025 to 0.060 N/m at 20° C., and preferably in the range of 0.030 to 0.050 N/m.

EXAMPLES

The present invention will now be specifically described with reference to examples. However, the embodiments of the present invention are not to be construed as being limited to these examples. Incidentally, "percent" in the examples is percent by weight unless otherwise specified.

Ink Jet Recording Sheets 1 through 15 were prepared as described below.

<<Preparation of Ink Jet Recording Sheet 1>>

Added to 100 g of 20 percent aqueous Cationic Polymer (1) solution (having a pH of 2.5) were 500 g of 20 percent water based dispersion of fine silica particles (Aerosil 200, manufactured by Nippon Aerosil), and subsequently 3 g of boric acid as well as 0.5 g of borax were also added. The resulting mixture was dispersed employing a high speed homogenizer. Subsequently, 270 ml of 6 percent aqueous solution of polyvinyl alcohol (PVA235, manufactured by Kuraray) was added to the resulting dispersion. Finally, by adding pure water, the total volume was adjusted to 1,000 ml, whereby a translucent coating composition (1) was prepared.

Cationic Polymer (1)

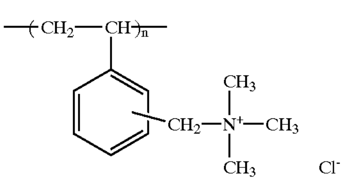

Subsequently, said coating composition (1) was applied onto the recording surface side of a paper support (having a thickness of 240 $\mu$m, and comprising 9 percent by weight of anatase type titanium dioxide in the polyethylene layer on the recording surface side), prepared by coating polyethylene onto both sides of 170 g/$m^2$ base paper, so as to achieve a wet layer thickness of 160 $\mu$m, and subsequently dried employing 20 to 40° C. air blasts, whereby Ink Jet Recording Sheet 1 was prepared.

<<Preparation of Ink Jet Recording Sheet 2>>

Added to 100 g of 20 percent aqueous Cationic Polymer (1) solution (having a pH of 2.5) were 500 g of 20 percent water based dispersion of fine silica particles having a average primary particle diameter of 12 nm (Aerosil 200, manufactured by Nippon Aerosil), and subsequently 3 g of boric acid as well as 0.5 g of borax were also added. The resulting mixture was dispersed employing a high speed homogenizer. Subsequently, 270 ml of 6 percent aqueous solution of polyvinyl alcohol (PVA235, manufacture ed by Kuraray) was gradually added to the resulting dispersion, and further, 20 ml of 15 percent aqueous zirconyl acetate solution were gradually added to the resulting mixture. Finally, by adding pure water, the total volume was adjusted to 1,000 ml, whereby a translucent coating composition (2) was prepared.

Subsequently, said coating composition (2) was applied onto the recording surface side of the same support as employed to prepare Ink Jet Recording Sheet 1, and subsequently dried with 20 to 40° C. air blasts, whereby Ink Jet Recording Sheet 2 was prepared.

<<Preparation of Ink Jet Recording Sheet 3>>

Translucent coating composition (3) was prepared in the same manner as coating composition (2) employed to prepare Ink Jet Recoding Sheet (2), except that 20 ml of said 15 percent aqueous zirconyl acetate solution was replaced with 40 ml of the same solution.

Subsequently, said coating composition (3) and coating composition (1), which was employed to prepare Ink Jet Recording Sheet 1, were successively applied in said order onto the recording surface of the same support as employed in Ink Jet Recording Sheet 1 so as to achieve a separate wet layer thickness of 80 $\mu$m for each sheet, and subsequently dried employing 20 to 40° C. airflow, whereby Ink Jet Recording Sheet 3 was prepared.

<<Preparation of Ink Jet Recording Sheet 4>>

Ink Jet Recording Sheet 4 was prepared in the same manner as Ink Jet Recording Sheet 3, except that the coating order was varied so that composition (1) and coating composition (3) were applied in said order onto the recording surface of said support.

<<Preparation of Ink Jet Recording Sheet 5>>

Translucent coating composition (4) was prepared in the same manner as coating composition (2) employed to prepare Ink Jet Recording Sheet 2, except that 20 ml of the 15 percent aqueous zirconyl acetate solution was replaced with 80 ml of the same.

Subsequently, coating composition (1), which was employed to prepare Ink Jet Recording Sheet 1, and said coating composition (4) were successively applied in said order onto the recording surface of the same support as employed in Ink Jet Recording Sheet 1 so as to achieve a wet layer thickness of 120 μm and 40 μm, respectively, and subsequently dried employing 20 to 40° C. airflow, whereby Ink Jet Recording Sheet 5 was prepared.

<<Preparation of Ink Jet Recording Sheet 6>>

Ink Jet Recording Sheet 6 was prepared by overcoating an aqueous zirconyl acetate solution onto the coated surface of Ink Jet Recording Sheet 1 so as to achieve a solid coated weight of 0.5 $g/m^2$.

<<Preparation of Ink Jet Recording Sheet 7>>

Translucent coating composition (5) was prepared in the same manner as coating composition (2) employed to prepare Ink Jet Recording Sheet 2, except that 20 ml of the 15 percent aqueous zirconyl acetate solution was replaced with 15 ml of an aqueous basic aluminum chloride (having an $Al_2O_3$ converted concentration of 23.75 percent and a basicity of 84.2 percent).

Subsequently, said coating composition (5) was applied onto the recording surface of the same support as employed in Ink Jet Recording Sheet 1 so as to achieve a wet layer thickness of 160 μm, and subsequently dried employing 20 to 40° C. airflow, whereby Ink Jet Recording Sheet 7 was prepared.

<<Preparation of Ink Jet Recording Sheet 8>>

Translucent coating composition (6) was prepared in the same manner as coating composition (2) employed to prepare Ink Jet Recording Sheet 2, except that 20 ml of the 15 percent aqueous zirconyl acetate solution was replaced with 30 ml of an aqueous basic aluminum chloride (having an $Al_2O_3$ converted concentration of 23.75 percent and a basicity of 84.2 percent.

Subsequently, said coating composition (6) and coating composition (1), which was employed to prepare Ink Jet Recording Sheet 1, were successively applied in said order onto the recording surface of the same support as employed in Ink Jet Recording Sheet 1 so as to achieve a separate wet layer thickness of 80 μm for each sheet, and subsequently dried employing 20 to 40° C. airflow, whereby Ink Jet Recording Sheet 8 was prepared.

<<Preparation of Ink Jet Recording Sheet 9>>

Ink Jet Recording Sheet 9 was prepared in the same manner as Ink Jet Recording Sheet 8, except that the coating order was varied so that composition (1) and coating composition (6) were applied in said order onto the recording surface of said support.

<<Preparation of Ink Jet Recording Sheet 10>>

Translucent coating composition (7) was prepared in the same manner as coating composition (2) employed to prepare Ink Jet Recording Sheet 2, except that 20 ml of the 15 percent aqueous zirconyl acetate solution was replaced with 60 ml of an aqueous basic aluminum chloride (having an $Al_2O_3$ converted concentration of 23.75 percent and a basicity of 84.2 percent.

Subsequently, coating composition (1), which was employed to prepare Ink Jet Recording Sheet 1, and said coating composition (7) were successively applied in said order onto the recording surface of the same support as employed in Ink Jet Recording Sheet 1 so as to achieve a wet layer thickness of 120 μm and 40 μm, respectively, and subsequently dried employing 20 to 40° C. airflow, whereby Ink Jet Recording Sheet 10 was prepared.

<<Preparation of Ink Jet Recording Sheet 11>>

Ink Jet Recording Sheet 11 was prepared by overcoating an aqueous zirconyl acetate solution onto the coated surface of Ink Jet Recording Sheet 1 so as to achieve a solid coated weight of 0.5 $g/m^2$.

<<Preparation of Ink Jet Recording Sheet 12>>

Translucent coating composition (8) was prepared in the same manner as coating composition (2) employed to prepare Ink Jet Recording Sheet 2, except that 20 ml of the 15 percent aqueous zirconyl acetate solution was replaced with 20 ml of a 15 percent aqueous ammonium zirconyl carbonate.

Subsequently, said coating composition (8) was applied onto the recording surface of the same support as employed in Ink Jet Recording Sheet 1 so as to achieve a separate wet layer thickness of 160 μm for each sheet, and subsequently dried employing 20 to 40° C. airflow, whereby Ink Jet Recording Sheet 12 was prepared.

<<Preparation of Ink Jet Recording Sheet 13>>

Ink Jet Recording Sheet 13 was prepared by overcoating an aqueous ammonium zirconyl carbonate solution onto the coated surface of Ink Jet Recording Sheet 1 so as to achieve a solid coated weight of 0.5 $g/m^2$.

<<Preparation of Ink Jet Recording Sheet 14>>

Translucent coating composition (9) was prepared in the same manner as coating composition (2) employed to prepare Ink Jet Recording Sheet 2, except that 20 ml of the 15 percent aqueous zirconyl acetate solution was replaced with 20 ml of a 15 percent aqueous aluminum sulfate solution.

Subsequently, said coating composition (9) was applied onto the recording surface of the same support as employed in Ink Jet Recording Sheet 1 so as to achieve a wet layer thickness of 160 μm, and subsequently dried employing 20 to 40° C. airflow, whereby Ink Jet Recording Sheet 14 was prepared.

<<Preparation of Ink Jet Recording Sheet 15>>

Ink Jet Recording Sheet 15 was prepared by overcoating an aqueous aluminum sulfate solution onto the coated surface of Ink Jet Recording Sheet 1 so as to achieve a solid coated weight of 0.5 $g/m^2$.

Each of the cross-sections of Recording Sheets 1 through 15, prepared as above, was subjected to a TOF-SIMS measurement, whereby $C_{0.2}/C_{0.8}$ was determined. Further, items (1) and (2) described below were evaluated. (1) Storage Bleeding Black lines, at a line of about 0.3 mm, were printed under an ambience of 23° C. and 55 percent relative humidify, employing an ink jet printer PM3000C, manufactured by Seiko Epson Co. Thereafter, the resulting sample was inserted into a transparent clear file holder. Said clear file holder without any additional treatment was set aside under an ambience of 40° C. and 80 percent relative humidity for one week. Subsequently, said line width (the width of the area having a reflection density which was one half of the maximum density was designated as said line width) before and after said storage was determined employing a microdensitometer, and values represented by the formula described below were designated as said storage bleeding. A decrease in said value shows a decrease in storage bleeding. A value of 1.5 or less was deemed to result in no problem for commercial viability.

Storage bleeding=line width after said storage/line width before said storage (2) Density Y, M, and C solid images were printed employing ink jet printer BJF850, manufactured by Canon. Printed samples were dried while being set aside at an ambience of 23° C. and 55 percent relative humidity for 5 hours. Thereafter, the resulting maximum reflection density (Dmax) was determined.

Table 1 shows the evaluation results.

TABLE 1

| | Zirconium Compound or Aluminum Compound | | Storage | Density | | |
|---|---|---|---|---|---|---|
| | Type | $C_{0.2}/C_{0.8}$ | Bleeding | Y | M | C |
| Recording Sheet 1 (Comparative Example) | — | — | 2.8 | 1.43 | 1.62 | 1.82 |
| Recording Sheet 2 (Comparative Example) | zirconyl acetate | 1.0 | 1.5 | 1.44 | 1.61 | 1.83 |
| Recording Sheet 3 (Comparative Example) | zirconyl acetate | 3.5 | 1.6 | 1.42 | 1.59 | 1.80 |
| Recording Sheet 4 (Present Invention) | zirconyl acetate | 0.5 | 1.2 | 1.56 | 1.72 | 1.98 |
| Recording Sheet 5 (Present Invention) | zirconyl acetate | 0.3 | 1.1 | 1.57 | 1.75 | 2.00 |
| Recording Sheet 6 (Present Invention) | zirconyl acetate | 0.6 | 1.3 | 1.55 | 1.72 | 1.97 |
| Recording Sheet 7 (Comparative Example) | basic aluminum chloride | 1.0 | 1.6 | 1.43 | 1.61 | 1.82 |
| Recording Sheet 8 (Comparative Example) | basic aluminum chloride | 3.7 | 1.7 | 1.42 | 1.60 | 1.80 |
| Recording Sheet 9 (Present Invention) | basic aluminum chloride | 0.7 | 1.3 | 1.53 | 1.72 | 1.96 |
| Recording Sheet 10 (Present Invention) | basic aluminum chloride | 0.4 | 1.2 | 1.55 | 1.74 | 1.98 |
| Recording Sheet 11 (Present Invention) | basic aluminum chloride | 0.7 | 1.3 | 1.54 | 1.72 | 1.95 |
| Recording Sheet 12 (Comparative Example) | ammonium zirconyl carbonate | 1.0 | 1.6 | 1.42 | 1.60 | 1.80 |
| Recording Sheet 13 (Present Invention) | ammonium zirconyl carbonate | 0.6 | 1.2 | 1.55 | 1.72 | 1.97 |
| Recording Sheet 14 (Comparative Example) | aluminum sulfate | 1.0 | 1.7 | 1.40 | 1.60 | 1.81 |
| Recording Sheet 15 (Present Invention) | aluminum sulfate | 0.7 | 1.3 | 1.53 | 1.73 | 1.97 |

Ink jet recording sheets of the present invention minimize bleeding and result in high image density.

The present invention makes it possible to provide a high quality ink jet recording sheet which minimizes bleeding and results in high image density.

What is claimed is:

1. An ink jet recording sheet comprising a support having thereon a porous ink absorptive layer comprising, inorganic particles, polyvinyl alcohol and a zirconium compound or an aluminum compound, wherein said ink absorptive layer exhibits a concentration gradient of said zirconium compound or said aluminum compound, wherein said concentration increases from the surface of said support towards the surface of said ink absorptive layer.

2. The ink jet recording sheet of claim 1, wherein said zirconium compound or said aluminum compound satisfies the following requirement:

$$0 \leq C_{0.2}/C_{0.8} \leq 0.8,$$

wherein $C_{0.8}$ and $C_{0.2}$ are a concentration of said zirconium compound or said aluminum compound at a distance of 8/10 and 2/10 of a thickness of the ink absorptive layer from the surface of the support, respectively.

3. The ink jet recording sheet of claim 1, wherein the ink absorptive layer comprises at least two layers, wherein an amount of said zirconium compound or said aluminum compound expressed in g/m2 in each of the two layers satisfies the following requirement:

$$0 < C_I/C_{II} \leq 0.8,$$

wherein $C_I$ is the amount of said zirconium compound or said aluminum compound in a lower layer and $C_{II}$ is the amount of said zirconium compound or said aluminum compound in an upper layer.

4. The ink jet recording sheet of claim 1, wherein an average diameter of primary particles of said inorganic particles is from 20 to 100 nm.

5. The ink jet recording sheet of claim 1, wherein a weight ratio of said inorganic particles to said polyvinyl alcohol is from 2:1 to 20:1.

6. The ink jet recording sheet of claim 1, wherein said support is a non-water absorptive support.

7. The ink jet recording sheet of claim 1, wherein said ink absorptive layer further comprises a cationic polymer.

8. The ink jet recording sheet of claim 1, wherein said polyvinyl alcohol is hardened with a hardener.

9. A method of preparing the ink jet recording sheet of claim 1, comprising the steps of:

a) applying a coating composition comprising the inorganic particles and polyvinyl alcohol to the support so as to form a first coating layer; and b) applying another coating composition comprising the zirconium compound or the aluminum compound on the first coating layer so as to form the ink absorptive layer.

* * * * *